United States Patent
Sekiguchi et al.

(10) Patent No.: US 6,519,273 B2
(45) Date of Patent: Feb. 11, 2003

(54) MAGNETIC BEARING AND CIRCULATION FAN APPARATUS

(75) Inventors: Shinichi Sekiguchi, Yokohama (JP); Hiroyuki Shinozaki, Fujisawa (JP); Shunichi Aiyoshizawa, Tokyo (JP); Toshimitsu Barada, Tokyo (JP); Atsushi Ooyama, Fujisawa (JP)

(73) Assignee: Ebara Corporation, Tokyo (JP)

( * ) Notice: Subject to any disclaimer, the term of this patent is extended or adjusted under 35 U.S.C. 154(b) by 179 days.

(21) Appl. No.: 09/785,304

(22) Filed: Feb. 20, 2001

(65) Prior Publication Data
US 2001/0017877 A1 Aug. 30, 2001

(30) Foreign Application Priority Data
Feb. 21, 2000 (JP) ........................................ 2000-042592

(51) Int. Cl.⁷ ................................................. H01S 3/22
(52) U.S. Cl. .......................... 372/58; 74/574; 361/144; 414/749.2
(58) Field of Search ............... 372/58, 38.1; 414/749.2; 361/144; 267/140.15; 310/90.5; 74/574

(56) References Cited

U.S. PATENT DOCUMENTS

| | | | |
|---|---|---|---|
| 5,980,193 A | * 11/1999 | Clifton et al. | ............ 414/749.2 |
| 6,337,872 B1 | * 1/2002 | Nara et al. | ..................... 372/58 |
| 6,359,767 B1 | * 3/2002 | Ooyana et al. | ............. 361/144 |
| 6,366,039 B1 | * 4/2002 | Sekiguchi et al. | .......... 318/268 |

* cited by examiner

*Primary Examiner*—Albert W. Paladini
(74) *Attorney, Agent, or Firm*—Armstrong, Westerman & Hattori, LLP

(57) ABSTRACT

A magnetic bearing enables to rotatably support a levitated body non-contactingly disposed in a hermetically sealed container filled with a gaseous process substance of a corrosive nature, while without contaminating the gaseous environment and suffering from corrosion. The magnetic bearing has an electromagnet for supporting a levitated body, a displacement sensor for detecting a levitated position of the levitated body, and a controller for supplying signals and excitation currents to the displacement sensor and the electromagnet through cables. An electromagnet target of the magnetic bearing that generates variations in magnetic fields due to rotation of the levitated body, is constructed of a single piece of ferromagnetic material, and is provided with an electrical insulation structure oriented parallel to magnetic fluxes generated by the electromagnet.

6 Claims, 7 Drawing Sheets

F I G. 5
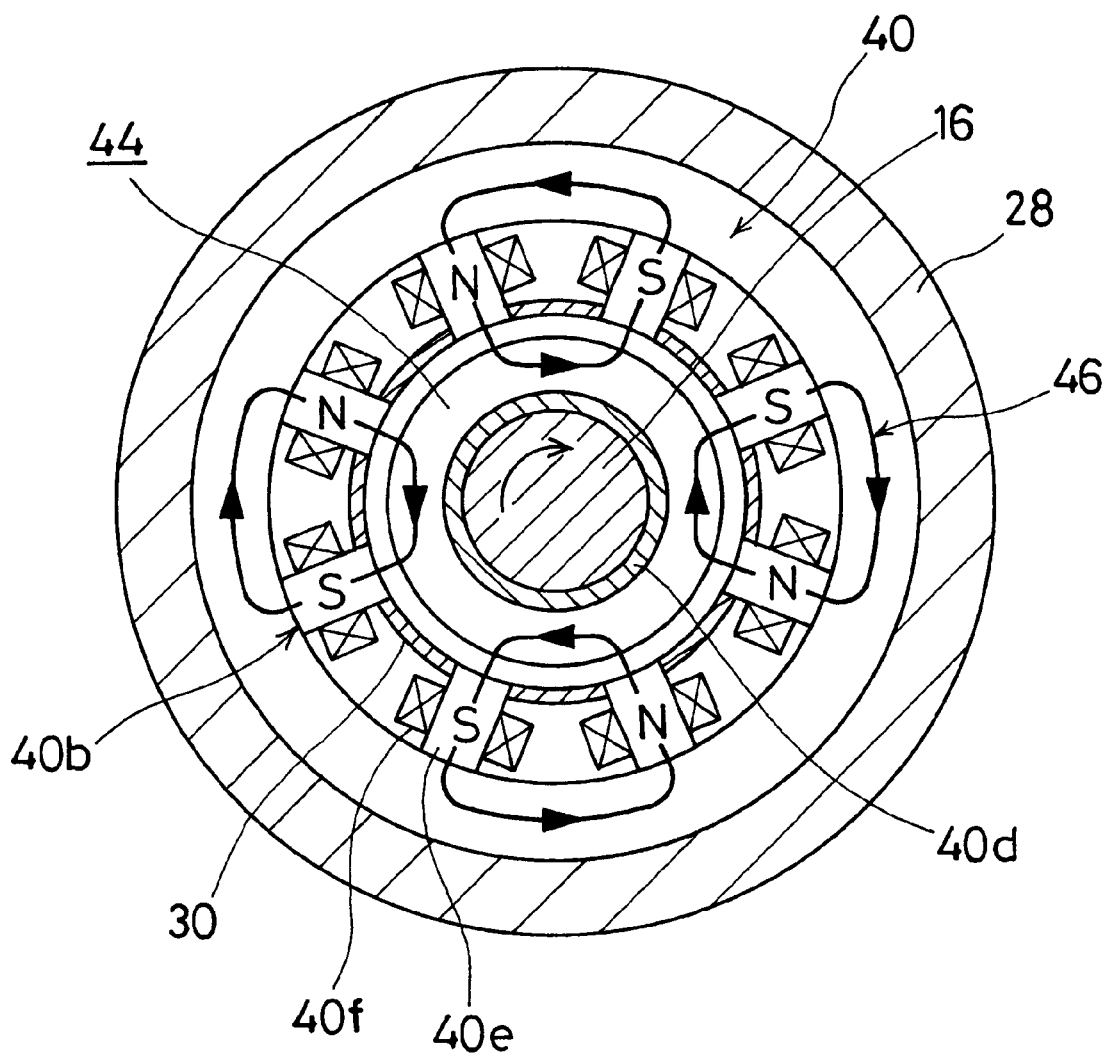

મેગ્નેટિક BEARING AND CIRCULATION FAN APPARATUS

BACKGROUND OF THE INVENTION

1. Field of the Invention

The present invention relates to a radial magnetic bearing for freely rotatably levitating a rotation shaft having a circulation fan disposed inside a container having a corrosive gas sealed-in, such as excimer laser apparatus, and a circulation fan apparatus provided with the radial magnetic bearing.

2. Description of the Related Art

Magnetic bearing, being different from contact type bearing such as sliding bearing or ball bearing, supports a rotor non-contactingly, thereby offering advantages such as: 1) mechanical loss is low; 2) friction and wear are non-existent; 3) lubricating oil is not required; 4) low vibration and noise; and 5) maintenance free. Some examples of application of magnetic bearing having such features include turbomolecular pumps used for generating a vacuum environment that contains little impurities and spindles for highspeed machining tools.

If the magnetic bearing is to be used in an environment that is extremely averse to impurities or corrosive environment, problems arise from emission of gaseous substances from materials of the magnetic bearing such as magnetic strips, copper coils and organic materials, for example, and from corrosion of these materials. For this reason, a protective coating is applied to the magnetic bearing so as to protect the materials of the magnetic bearing from the corrosive environment. An example of using magnetic bearings for freely rotatably levitating the rotation shaft of a circulation fan is an excimer laser apparatus.

FIG. 6 shows a cross sectional view of a conventional excimer laser apparatus, and FIG. 7 is an enlarged view of a key section of FIG. 6. In the conventional excimer laser apparatus, as shown in FIG. 6, a laser vessel 10 that seals in a laser gas such as a halogen group gas, is provided with: a pre-ionizing electrode (not shown) for pre-ionizing the laser gas; and at least a pair of main discharge electrodes 12, 12 to obtain an electric discharge to enable oscillation of laser light. Further, inside the laser vessel 10 is provided a circulation fan 14 for producing a highspeed flow of the laser gas between the main discharge electrodes 12, 12.

The circulation fan 14 has a rotation shaft 16 passing through the laser vessel 10 and extending between both end sections of the laser vessel 10. The rotation shaft 16 is freely rotatably supported by magnetic bearings 20, 22 and an axial magnetic bearing 24 non-contactingly, which are placed at each end portions of the laser vessel 10. Also, a motor 26 is provided on the axial-end side of the radial magnetic bearing 20 at one-end.

A displacement sensor 20a and an electromagnet 20b of one-end radial magnetic bearing 20 and the stator 26a of the motor 26 are housed in the motor housing 28, and their inside surfaces are protected by a thin walled cylindrical isolation wall 30 made of a material that is resistant to corrosion against halogen group gases contained in the laser gas, for example, austenite type stainless steels such as SUS316L and the like. Accordingly, the displacement sensor 20a, electromagnet 20b and the stator 26a of the motor 26 are prevented from coming into contact with the laser gas. A displacement sensor 22a of the radial magnetic bearing 22 and the electromagnet 22b at the opposing-end are similarly constructed, and are housed inside the bearing housing 32, and their inner surfaces are protected by an isolation wall 34.

Displacement sensor targets 20c, 22c and electromagnet targets 20d, 22d of the radial magnetic bearings 20, 22, and the rotor 26b of the motor 26 are affixed to the rotation shaft 16, and are disposed so as to oppose the respective displacement sensors 20a, 22a and electromagnets 20b, 22b of the radial magnetic bearings 20, 22, and the stator 26a of the motor 26. The displacement sensor targets 20c, 22c, and electromagnet targets 20d, 22d for the radial magnetic bearings 20, 22, and the rotor 26b of the motor 26 affixed to the rotation shaft 16 are installed inside the sealed container communicating with the laser vessel 10. Therefore, they are required to be resistant to corrosion by the laser gas and not contaminate the laser gas.

Therefore, the displacement sensor targets 20c, 22c and electromagnet targets 20d, 22d are generally made by applying a Ni plating on the surface of a laminated steel plate or cladding the surface with stainless steel, or using a single piece ferromagnetic material resistant to corrosion by the laser gas, for example, Permalloy (Fe—Ni alloy containing 35–80% Ni). Also, because the rotor 26b of the motor 26 is made of a composite of laminated steel plate and aluminum alloys or a permanent magnet, Ni-plating does not adhere tightly and uniformly to the surface, and for this reason, contact with the laser gas is prevented by creating a sealed space on its surface produced by installing the isolation wall 36 made of a stainless steel.

However, in the conventional radial magnetic bearings, if the electromagnet target is made of a structure produced by surface treatment such as Ni plating on laminated steel sheets, Ni plating does not adhere tightly to the laminated steel sheets, so that there is a possibility that the plating can peel off to expose the laminated steel to corrosion. Furthermore, because of the lamination structure, the surface area is large and gases can be trapped on the surface to cause potential contamination of the laser gas.

Also, when a structure made of stainless steel cladding is used, because the distance between the electromagnet and the electromagnet target of the radial magnetic bearing must be increased by an amount equal to the sheet thickness of the isolation wall, the size of the electromagnets tends to increase.

Further, when a structure made of a single piece ferromagnetic material resistant to corrosion is used for the radial magnetic bearing 20, as shown in FIG. 7, eddy current E is generated in the interior of the electromagnet target 20d due to variations in the magnetic fields introduced by the rotation of the rotation shaft 16, and the magnetic flux M generated by the electromagnet 20b is reduced by the eddy current E in the electromagnet target 20d so that the magnetic strength is lowered. Especially, the eddy current E increases in proportion to the square of the speed of magnetic field change so that as the rotational speed of the rotation shaft 16 increases, drop in the magnetic strength becomes noticeable. The same phenomenon occurs at the opposing-end radial magnetic bearing 22.

SUMMARY OF THE INVENTION

The present invention is performed in view of the background presented above, and it is an object of the present invention to provide a magnetic bearing that does not generate gas contamination and has good corrosion resistance, and enables to rotatably support a levitated body without contact while generating a magnetic force of appropriate strength, and a circulation fan apparatus equipped with the magnetic bearing.

According to an aspect of the present invention, there is provided a magnetic bearing having an electromagnet for supporting a levitated body, a displacement sensor for detecting a levitated position of the levitated body, and a controller for supplying signals and excitation currents to the displacement sensor and the electromagnet through cables; wherein an electromagnet target of the magnetic bearing that generates variations in magnetic field due to rotation of the levitated body, is comprised of a single piece of ferromagnetic material, and is provided with an electrical insulation structure oriented parallel to magnetic fluxes generated by the electromagnet.

According to the above magnetic bearing, because the electromagnet target is comprised of a single piece ferromagnetic material, the surface area of the electromagnet target is less compared with a similar electromagnet target made by laminated steel sheets, and gas trapping sites are reduced so that contamination from the electromagnet target can also be lessened significantly. Further, because the electromagnet target has an electrical insulation structure oriented parallel to the magnetic flux generated by the electromagnet, even when variations in the magnetic field is created due to rotation of the levitated body and so on, eddy current generated in the interior of the electromagnet target is reduced. That is, the specific resistance in the longitudinal direction of the magnetic circuit formed among the electromagnet, the electromagnet target and the electrical insulation structure is increased so that the electromagnet target is able to reduce the eddy current generated by magnetic field change so that a stable magnetic force can be generated. The result is that the levitated body can be levitated in a stable manner at all times.

According to the present invention, the electrical insulation structure preferably comprises of slit groove.

According to this structure, because the electrical insulation structure on the electromagnet target is provided in a form of slit groove, gas trapping sites are reduced and the surface area of the electromagnet target can be limited to a minimum. Accordingly, electrical insulation structure that does not act as a gaseous contamination source can be provided for the electromagnet target at low cost.

According to another aspect of the present invention, there is provided a circulation fan apparatus having a rotation shaft of a circulation fan, disposed in a hermetically sealed container filled with a gaseous process substance of a corrosive nature, said rotation shaft being supported with not less than two radial magnetic bearings, wherein an electromagnet target of the radial magnetic bearing is comprised of a single piece ferromagnetic material and is provided with an electrical insulation structure at a given spacing along an axial direction of the rotation shaft.

According to the above circulation fan apparatus, the electromagnet target of the radial magnetic bearing supporting the rotation shaft of the circulation fan is comprised of a single piece ferromagnetic material, and has an electrical insulation structure formed at a given spacing along the axial direction of the rotation shaft. For this reason, the electromagnet target does not contaminate the gaseous environment in the container, and it can easily made resistant to corrosive gases. Further, even when variations in the magnetic field is created due to rotation of the rotation shaft and so on, eddy current generated in the interior of the electromagnet target is lessened. That is, the specific resistance of the magnetic circuit in the direction of the rotation shaft, formed among the electromagnet, the electromagnet target and electrical insulation structure, is increased so that the electromagnet target is able to reduce the eddy current generated by magnetic field change and a stable magnetic force can be generated. The result is that the levitated body can be levitated in a stable manner at all times.

According to the present invention, the circulation fan apparatus has an electromagnet target, which has the electrical insulation structure that preferably comprises of slit groove.

According to the above structure, because the electrical insulation structure on the electromagnet target is provided in a form of slit groove, gas trapping sites are reduced and the surface area of the electromagnet target is limited to a minimum, and accordingly, an electrical insulation structure can be provided at low cost for the electromagnet target that does not act as a gaseous contamination source.

As explained above, according to the present invention, even if variations in the magnetic field occur in the electromagnet target due to rotation of the rotation shaft as a levitated body, eddy current losses can be suppressed, thereby enabling to produce a stable levitation force. Also, when the rotation shaft as a levitated body is rotated at high speed, by selecting the number of slit grooves appropriately, it is possible to provide a radial magnetic bearing that produces less eddy current losses and prevents gaseous contamination of the working environment.

According to the present invention, an excimer laser apparatus comprising a circulation fan apparatus according to claim 3 or claim 4.

The above and other objects, features, and advantages of the present invention will be apparent from the following description when taken in conjunction with the accompanying drawings which illustrates preferred embodiments of the present invention by way of example.

BRIEF DESCRIPTION OF THE DRAWINGS

FIG. 5 is a cross sectional view through a plane along line B—B in FIG. 4;

DETAILED DESCRIPTION OF THE PREFERRED EMBODIMENTS

Preferred embodiments will be explained in the following, with reference to FIGS. 1 to 5.

Figure 1:
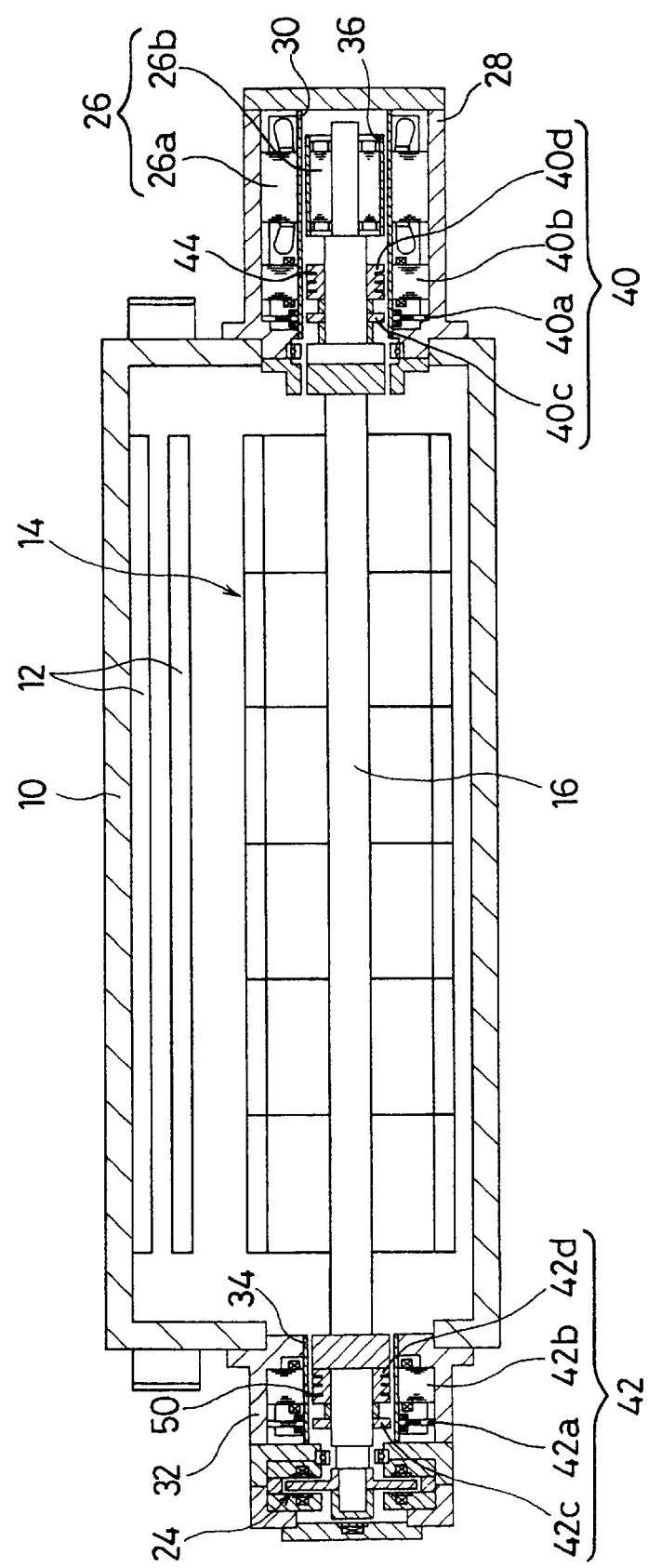
FIG. 1 is a cross sectional view of an excimer laser apparatus as an example of the circulation fan apparatus equipped with the magnetic bearing according to the first embodiment of the present invention.
Figure 2:
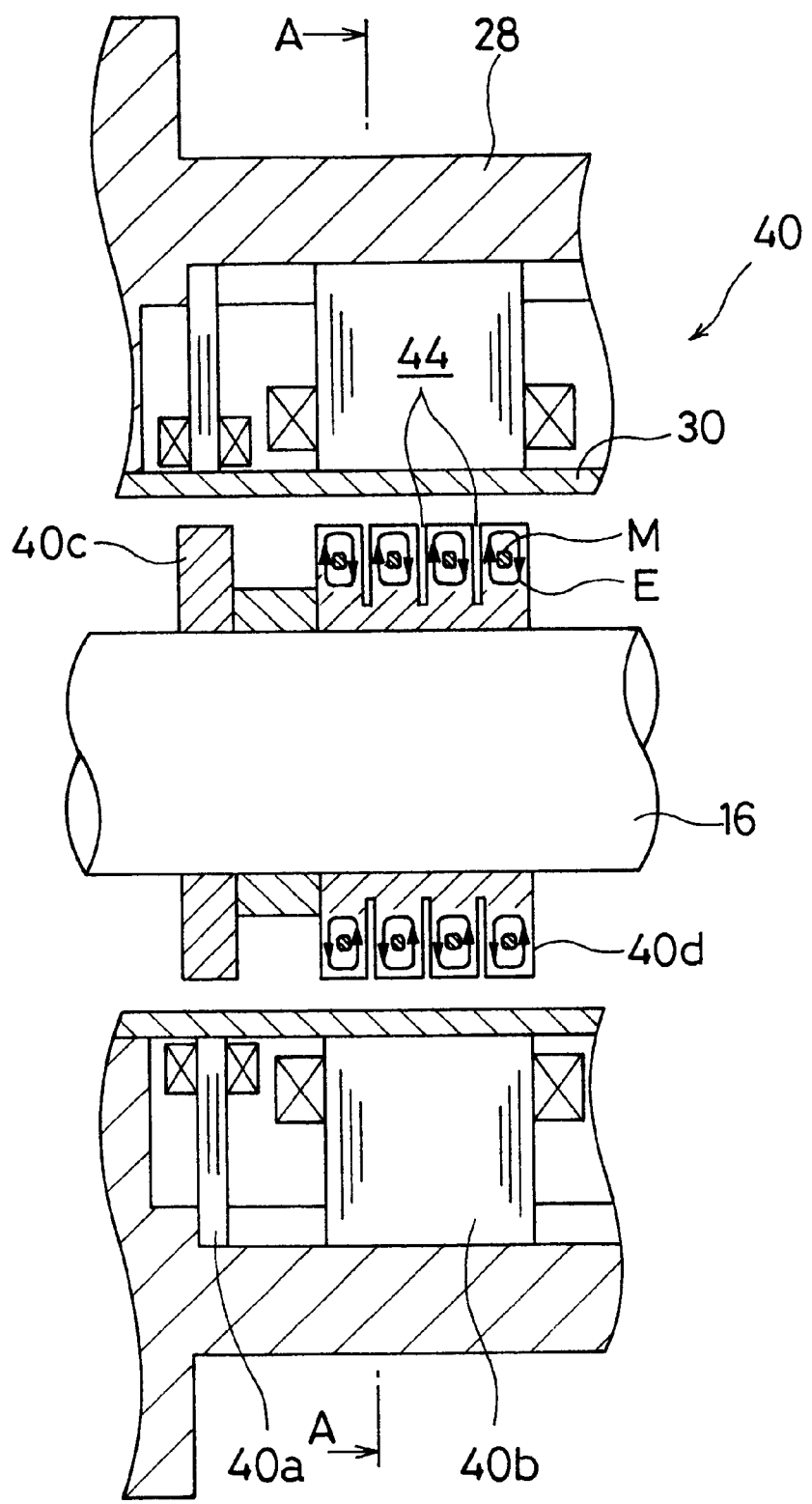
FIG. 2 is an enlarged view of a key part in FIG. 1.
Figure 3:
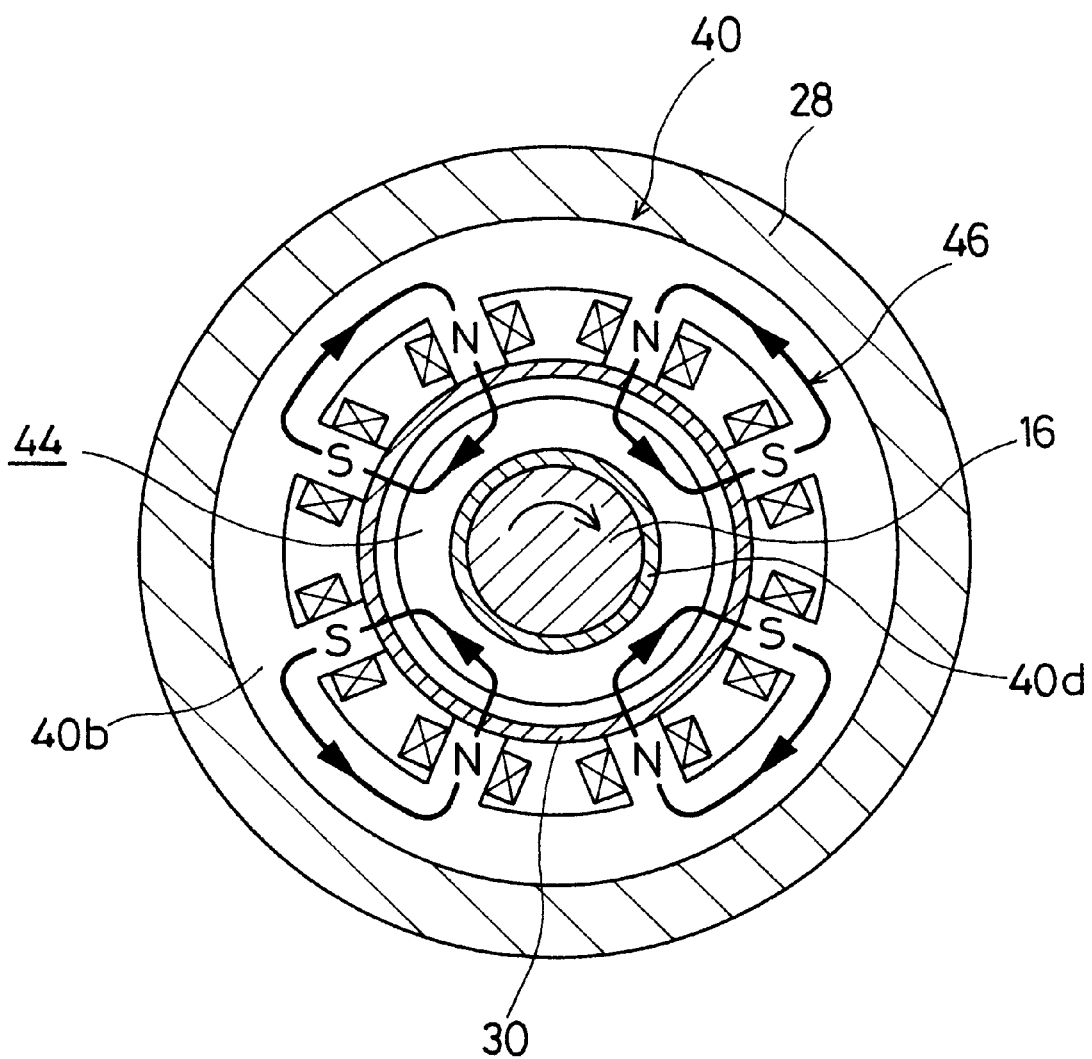
FIG. 3 is a cross sectional view through a plane along line A—A in FIG. 2.

FIG. 1 is a cross sectional view of an excimer laser apparatus as an example of a circulation fan apparatus equipped with the magnetic bearing of the first embodiment of the present invention, FIG. 2 is an enlarged view of a key part of FIG. 1, and FIG. 3 is a cross sectional view through a plane along line A—A in FIG. 2. Here, those parts of the present apparatus that are the same as those in the conventional example shown in FIGS. 6, 7 are referred to by the same reference numerals, and their explanations are partly omitted.

Figure 6:
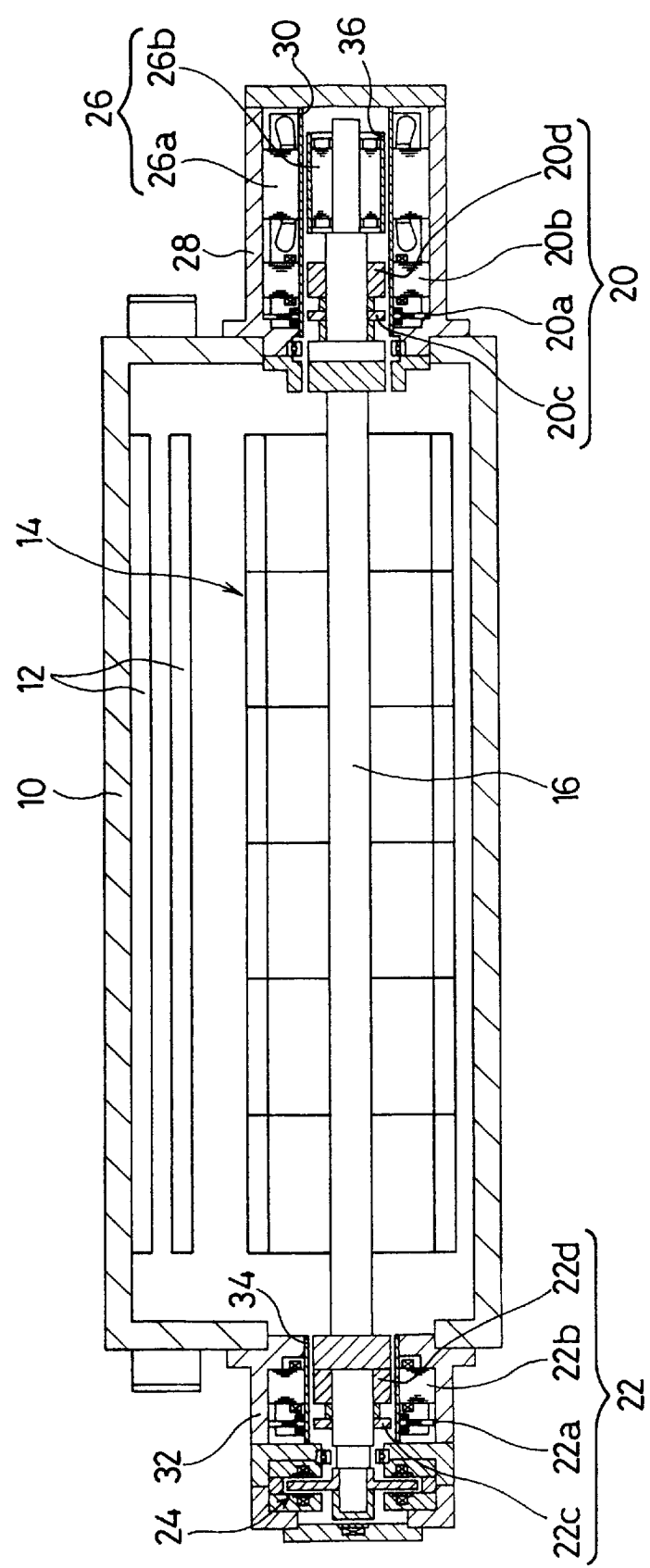
FIG. 6 is a cross sectional view of a conventional excimer laser apparatus.
Figure 7:
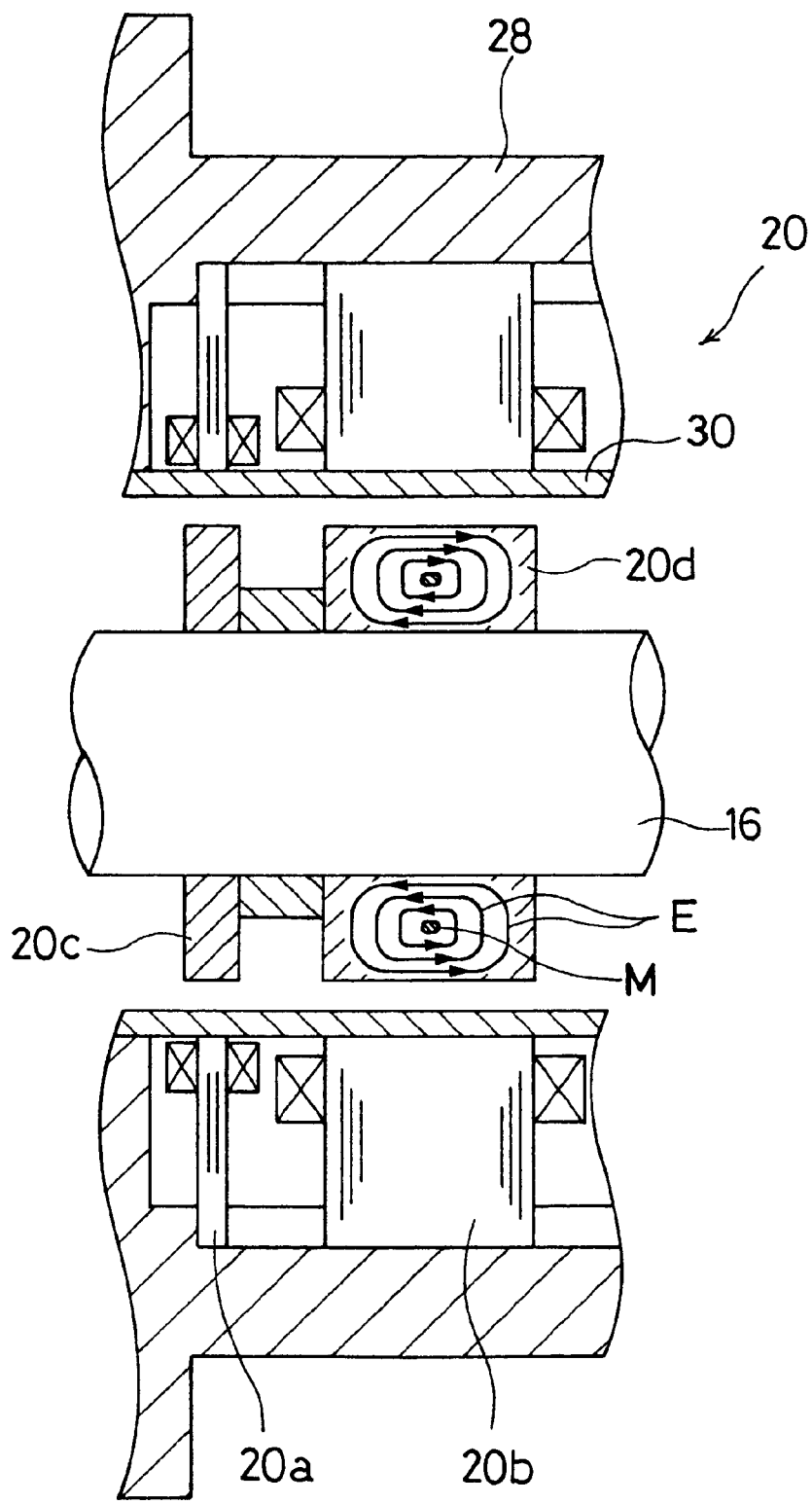
FIG. 7 is an enlarged view of a key part in FIG. 4.

This excimer laser apparatus, similar to the conventional example shown in FIGS. 6 and 7, has a laser vessel 10 having a halogen group gas such as fluorine sealed in, and provided inside the vessel 10 are a pre-ionization electrode (not shown) for pre-ionizing the laser gas and at least a pair of main discharge electrodes 12 to obtain an electric discharge to enable oscillation of laser light. Further, a circulation fan 14 for generating a flow of highspeed laser gas between the pair of main electrodes 12 is disposed in the vessel 10.

The circulation fan 14 has a rotation shaft 16 passing through the laser vessel 10 and extending between both end sections of the laser vessel 10. The rotation shaft 16 is freely rotatably supported by magnetic bearings 40, 42 and an axial magnetic bearing 24 non-contactingly placed at both end portions of the laser vessel 10. Also, a motor 26 is provided on the axial end side of the radial magnetic bearing 40 at one end.

The radial magnetic bearing 40 at one end comprises a displacement sensor 40a, an electromagnet 40b, a displacement sensor target 40c and an electromagnet target 40d. A positional signal detected from the displacement sensor 40a is input into a controller (not shown) through a cable (not shown), and the rotation shaft 16 is levitated at the target position by applying the excitation current to electromagnet 40b based on the input positional signal.

The displacement sensor 40a and the electromagnet 40b are housed inside the motor housing 28, and their inner surfaces are covered by a thin walled cylindrical isolation wall 30 made of a material that is resistant to corrosion by a halogen group gas contained in the laser gas, an austenite type stainless steel such as SUS316L, for example. By this manner, the displacement sensor 40a and the electromagnet 40b are prevented from coming into contact with the laser gas.

On the other hand, the displacement sensor target 40c and the electromagnet target 40d are affixed to the rotation shaft 16, and are disposed in a hermetic space that communicates with the laser vessel 10. The displacement sensor target 40c and the electromagnet target 40d are both made of a single piece ferromagnetic material resistant to corrosion by a halogen gas group gas contained in the laser gas, for example, Permalloy (an Fe—Ni alloy containing 35–80% Ni). And, the electromagnet target 40d is provided with slit grooves 44 extending from the outer periphery to inward of the electromagnet target 40d at a given spacing along the axial direction of the rotation shaft 16.

According to this structure, even when variations in the magnetic field are produced due to rotation and other effects of the rotation shaft 16, eddy current E generated in the interior of the electromagnet target 40d can be reduced. That is, as shown in FIG. 2, the specific resistance of the magnetic circuit in the electromagnet target 40d along the axial direction of the rotation shaft 16 formed among the electromagnet 40b, the electromagnet target 40d and the slit grooves 44 is increased, so that a magnetic flux M due to electromagnet 40b is generated in each region of the divided slit grooves 44 of the electromagnet target 40d, causing the eddy current E to flow around each magnetic flux M so that eddy current generated by the magnetic field change is minimized, thereby generating a stable magnetic force. The result is that the rotation shaft 16 can be levitated stably at all times.

It is preferable that the width of the slit groove 44 be as narrow as possible to secure the magnetic pole area, and, as shown in FIG. 3, the depth should preferably be at least equal to or more than the size of the magnetic path 46 of the magnetic flux M generated by the electromagnet 40b. Here, higher the number of slit grooves 44 more effective they are in reducing the eddy current, but the magnetic pole area is decreased proportionately so that it is preferable to determine this number according to the speed that induces magnetic field change, that is, based on a parameter determined by the outer radius of the electromagnet target 40d and the rotational speed.

The radial magnetic bearing 42 at the opposing-end similarly comprises a displacement sensor 42a, an electromagnet 42b, a displace sensor target 42c and an electromagnet target 42d. A positional signal detected from the displacement sensor 42a is input into the controller (not shown) through the cable (not shown), and the rotation shaft 16 is levitated at the target position by applying the excitation current to the electromagnet 42b based on the input positional signal. The displacement sensor 42a and the electromagnet 42b are housed inside the bearing housing 32, and their inner surfaces are covered by an isolation wall 34 of a thin cylindrical shape.

Also, the displacement sensor target 42c and the electromagnet target 42d made of a single piece ferromagnetic material such as Permalloy are affixed to the rotation shaft 16. And, the electromagnet target 42d is provided with slit grooves 50 at a given spacing along the axial direction of the rotation shaft 16 so that even if variations in the magnetic fields occur due to rotation and so on of the rotation shaft 16, eddy current generated in the interior of the electromagnet target 42d can be reduced.

Figure 4:
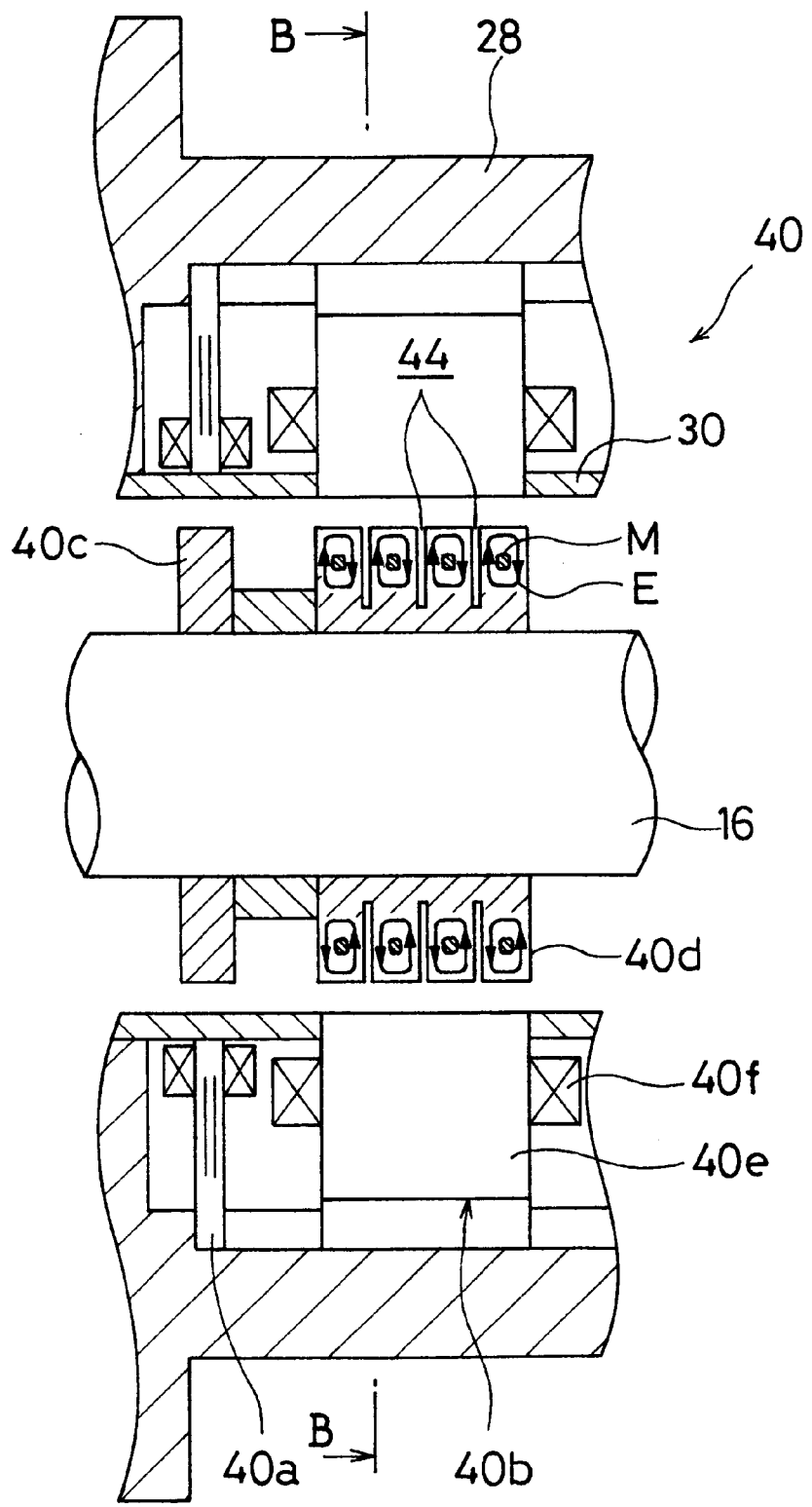
FIG. 4 is an enlarged cross sectional view of a key part of an excimer laser apparatus equipped with the magnetic bearing according to the second embodiment of the present invention (drawing corresponding to FIG. 2)

FIG. 4 and FIG. 5 show an excimer laser apparatus equipped with the magnetic bearing of the second embodiment of the present invention. FIG. 4 is an enlarged cross sectional view of a key part of the excimer laser apparatus (drawing corresponding to FIG. 2), FIG. 5 is a cross sectional view through a plane along line B—B in FIG. 4.

In this second embodiment, a magnetic bearing 40, differ from the first embodiment, has an electromagnet 40b whose projections of the cores 40e pierce an isolation wall 30 and expose their inner surface. Herein, the cores 40e of the electromagnet 40b are required to have resistant to corrosion because they come into contact with the laser gas. Therefore, the cores 40e of the electromagnet 40b are made of Permalloy that is resistant to corrosion by the laser gas. The cores 40e of the electromagnet 40b are affixed to the isolation wall 30 by welding and the like so as to prevent a coil winding 40f of the electromagnet 40b that has poor resistant to corrosion by the laser gas from coming into contact with the laser gas.

According to the second embodiment, a magnetic gap between the cores 40e of the electromagnet 40b and an electromagnet target 40d is prevented from being enlarged by the existence of the isolation wall 30. Therefore, it can realize improved efficiency of a magnetic bearing, reduced electric power consumption, and compactness of the magnetic bearing.

In these embodiments, each application of the magnetic bearings was exemplified by an excimer laser apparatus, it is not limited to such excimer laser apparatus only. Also, it is obvious that the magnetic bearing is applicable to any application that requires improvement in corrosion resistance in the electromagnet target of the magnetic bearing and eliminate contamination of laser gas.

Although certain preferred embodiments of the present invention have been shown and described in detail, it should be understood that various changes and modifications may be made therein without departing from the scope of the appended claims.

What is claimed is:

1. A magnetic bearing having an electromagnet for supporting a levitated body, a displacement sensor for detecting a levitated position of said levitated body, and a controller for supplying signals and excitation currents to said displacement sensor and said electromagnet through cables; wherein an electromagnet target of the magnetic bearing that generates variations in magnetic field due to rotation of said levitated body, is comprised of a single piece of ferromagnetic material, and is provided with an electrical insulation structure oriented parallel to magnetic flux generated by said electromagnet.

2. A magnetic bearing according to claim 1, wherein said electrical insulation structure is comprised of slit groove.

3. A circulation fan apparatus having a rotation shaft of a circulation fan, disposed in a hermetically sealed container filled with a gaseous process substance of a corrosive nature, said rotation shaft being supported with not less than two radial magnetic bearings, wherein an electromagnet target of said radial magnetic bearing is comprised of a single piece ferromagnetic material and is provided with an electrical insulation structure at a given spacing along an axial direction of the rotation shaft.

4. A circulation fan apparatus according to claim 3, wherein said electrical insulation structure is comprised of slit groove.

5. An excimer laser apparatus comprising a circulation fan apparatus according to claim 3.

6. An excimer laser apparatus comprising a circulation fan apparatus according to claim 4.

* * * * *